United States Patent
Butler et al.

(10) Patent No.: US 10,744,532 B1
(45) Date of Patent: Aug. 18, 2020

(54) END DRIVEN BENDER TRANSDUCTION APPARATUS

(71) Applicants: John L. Butler, Cohasset, MA (US); Alexander L. Butler, Braintree, MA (US)

(72) Inventors: John L. Butler, Cohasset, MA (US); Alexander L. Butler, Braintree, MA (US)

(73) Assignee: Image Acoustics, Inc., Cohasset, MA (US)

( * ) Notice: Subject to any disclaimer, the term of this patent is extended or adjusted under 35 U.S.C. 154(b) by 306 days.

(21) Appl. No.: 15/586,933

(22) Filed: May 4, 2017

Related U.S. Application Data

(60) Provisional application No. 62/332,766, filed on May 6, 2016.

(51) Int. Cl.
  *B06B 1/06* (2006.01)
  *G10K 9/12* (2006.01)

(52) U.S. Cl.
  CPC .......... *B06B 1/0603* (2013.01); *B06B 1/0618* (2013.01); *G10K 9/121* (2013.01)

(58) Field of Classification Search
  CPC ...... B06B 1/0603; B06B 1/0618; G10K 9/121
  USPC .................................. 367/160–161
  See application file for complete search history.

(56) References Cited

U.S. PATENT DOCUMENTS

| | | | |
|---|---|---|---|
| 3,603,921 A * | 9/1971 | Dreisbach | B06B 1/0603 367/155 |
| 4,127,749 A * | 11/1978 | Atoji | H04R 7/16 310/800 |
| 4,332,986 A | 6/1982 | Butler | |
| 4,742,499 A | 5/1988 | Butler | |
| 4,754,441 A | 6/1988 | Butler | |
| 4,845,688 A | 7/1989 | Butler | |
| 4,864,548 A | 9/1989 | Butler | |
| 5,047,683 A | 9/1991 | Butler et al. | |
| 5,184,332 A | 2/1993 | Butler | |
| 5,237,543 A * | 8/1993 | Erickson | G10K 9/121 310/337 |
| 5,406,531 A * | 4/1995 | Henriquez | B06B 1/0603 310/322 |
| 5,834,879 A * | 11/1998 | Watanabe | D03C 3/20 310/328 |
| 5,856,956 A * | 1/1999 | Toki | B06B 1/0603 310/324 |
| 6,614,143 B2 * | 9/2003 | Zhang | G10K 9/121 310/317 |
| 6,734,604 B2 | 5/2004 | Butler et al. | |
| 6,950,373 B2 | 9/2005 | Butler et al. | |
| 7,292,503 B2 | 11/2007 | Butler et al. | |
| 7,372,776 B2 | 5/2008 | Butler et al. | |
| 7,453,186 B1 | 11/2008 | Butler et al. | |
| 7,692,363 B2 | 4/2010 | Butler et al. | |

(Continued)

*Primary Examiner* — Ian J Lobo
(74) *Attorney, Agent, or Firm* — David M. Driscoll

(57) ABSTRACT

An underwater acoustic transducer that is capable of radiating acoustic energy at low frequencies. A transducer which is a resonant low frequency bender-type transducer driven at its end supports by a piezoelectric stack of material operating with inner and outer parts driven in opposite directions creating a bending motion of a radiating beam, plate or disc. The small piezoelectric motions at the beam supports are magnified by the leveraged motion of the bending beam(s) creating significant output at low frequencies.

31 Claims, 12 Drawing Sheets

(56) References Cited

U.S. PATENT DOCUMENTS

| | | |
|---|---|---|
| 8,072,843 B1 | 12/2011 | Butler et al. |
| 8,552,625 B1 | 10/2013 | Butler et al. |
| 8,599,648 B1 | 12/2013 | Butler et al. |
| 8,659,211 B1 | 2/2014 | Butler et al. |
| 8,836,792 B1 | 9/2014 | Butler |
| 9,036,029 B2 | 5/2015 | Butler |

* cited by examiner

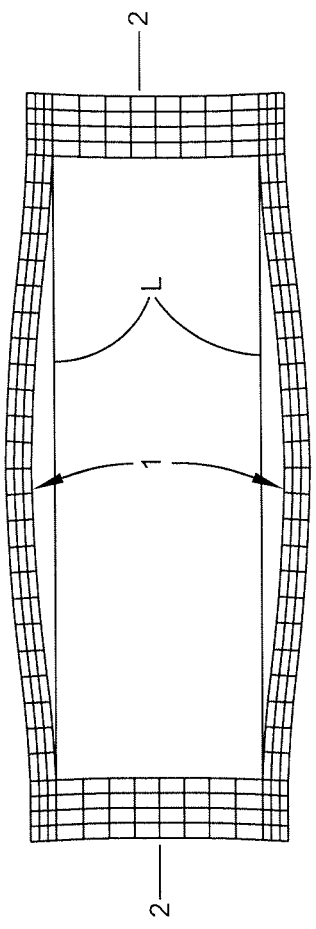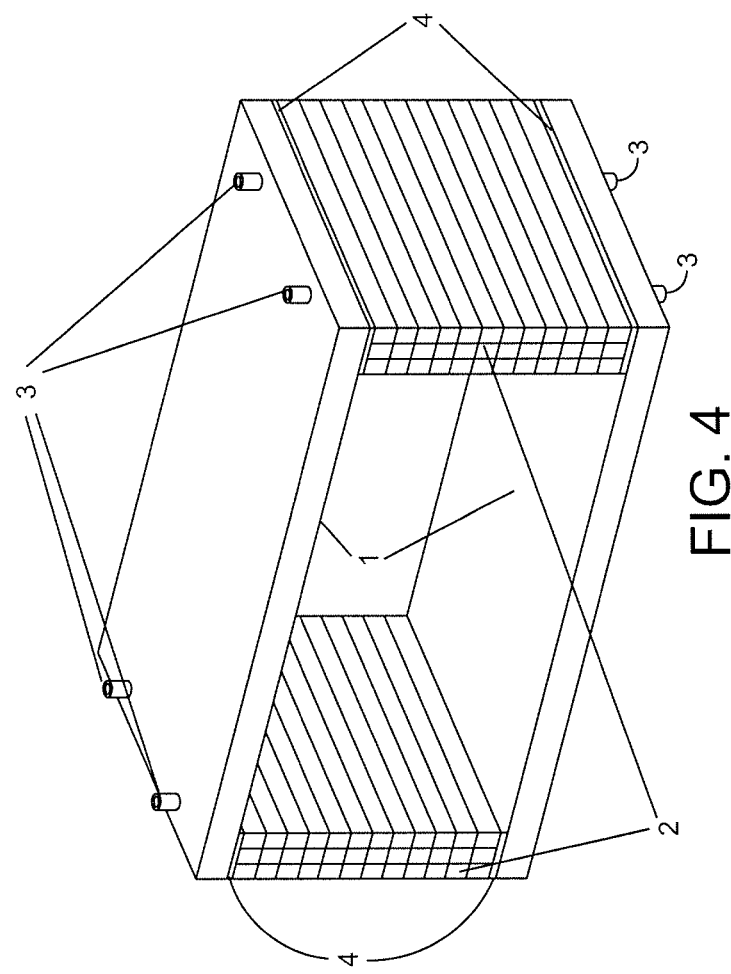
FIG. 3
FIG. 4

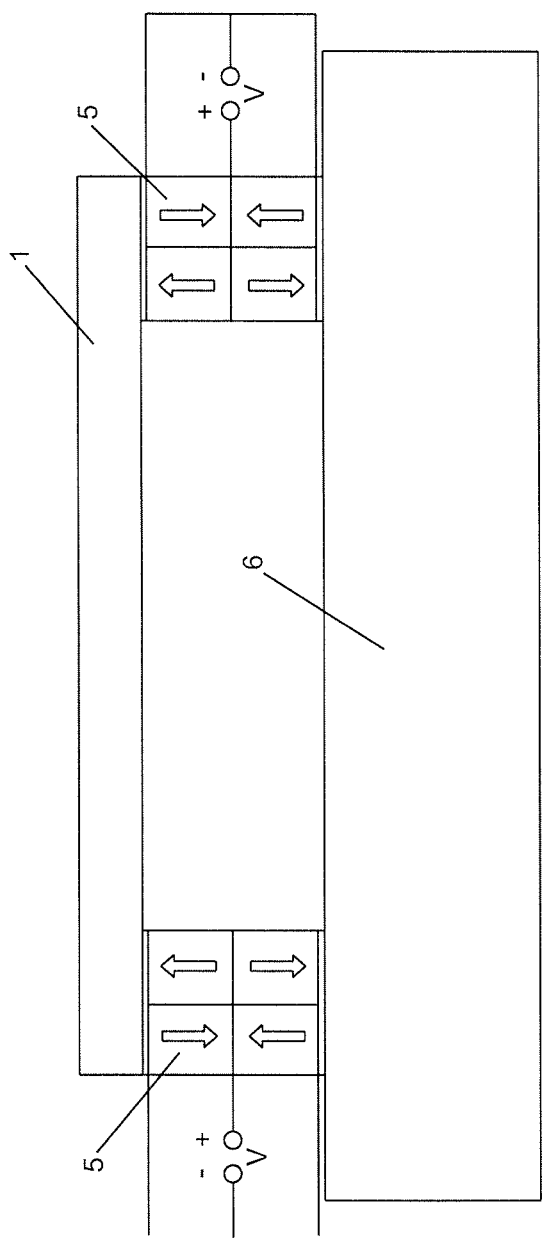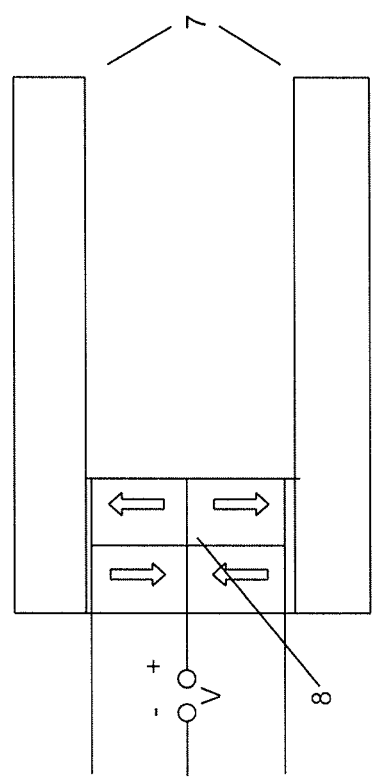
FIG. 7
FIG. 8

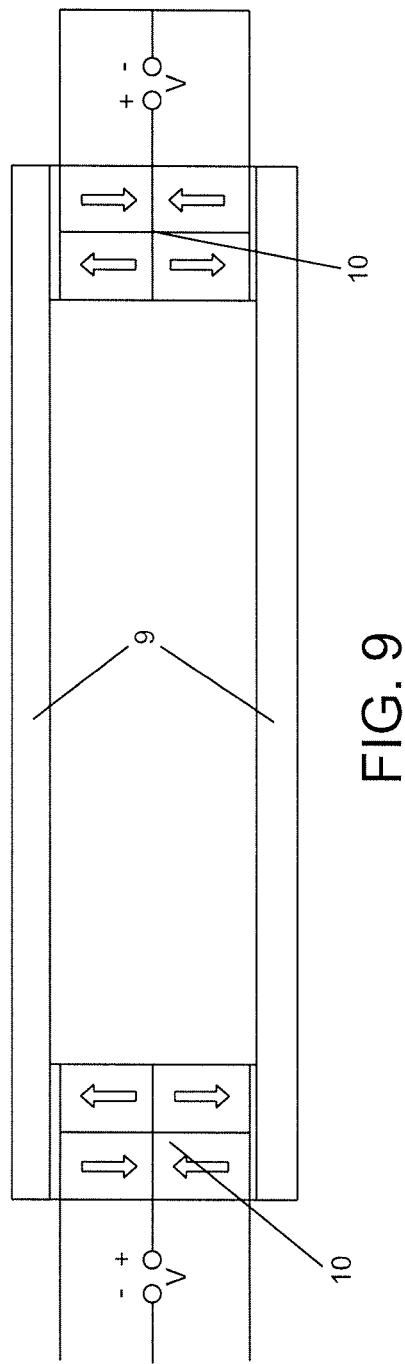
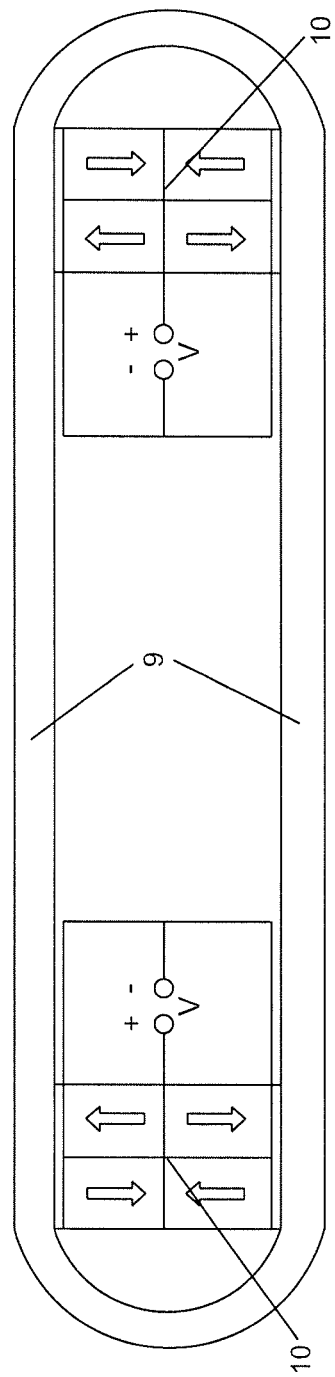
FIG. 9
FIG. 10

END DRIVEN BENDER TRANSDUCTION APPARATUS

RELATED CASE

Priority for this application is hereby claimed under 35 U.S.C. § 119(e) to commonly owned and co-pending U.S. Provisional Patent Application No. 62/332,766 which was filed on May 6, 2016 and which is incorporated by reference herein in its entirety.

BACKGROUND OF THE INVENTION

1. Field of the Invention

The present invention relates in general to transducers, and more particularly to underwater acoustic transducers capable of radiating acoustic energy at low frequencies. The present invention also relates to a resonant low frequency bender-type transducer driven at its ends by a piezoelectric stack of material operating with inner and outer parts electrically driven in opposite directions creating a bending motion of a non-piezoelectric beam or disc. The small piezoelectric motions at the beam supports are magnified by the leveraged motion of the bending beam. Although preferably meant for under water operation, it may also be used in air applications.

2. Background Discussion

Low frequency underwater sound transducers require a radiating compliant structure to obtain a low resonant frequency along with a high output level. This can and has been accomplished within a fixed volume at low frequencies by means of bender transducers in the form of piezoelectric excited radiating bending beams or discs mounted on its ends, typically achieving an inactive simply supported type end condition.

The low frequency resonance frequency, $f_r$, may be calculated from an equation of the form $$f_r = Act/L^2$$

where A is a constant depending on the end mounting condition or shape, c is the speed of sound in the bending material (for example, aluminum or steel), t is the thickness and L is the length of the bending beam. As the length is doubled, the resonance frequency goes down by a factor of four rapidly achieving a low resonance frequency as the length is increased. In the present end driven bender invention the piezoelectric material (for example PZT, textured ceramic or single crystal material) which drives the bending is located as a part or all of the end support rather than as part or all of the bending beam as in prior art; such as, for example, "Cantilever Type Acoustic Transduction Apparatus," Butler et al. U.S. Pat. No. 8,552,625 B1, Oct. 2013. In the present invention the bending beam radiates into the medium and is not necessarily piezoelectric material, as it is in prior art designs.

SUMMARY OF THE INVENTION

To accomplish the foregoing and other objects, features and advantages of the invention there is provided an improved electro-mechanical bender transduction apparatus that is electrically driven by piezoelectric material, with inner and outer parts driven in opposite directions at supporting ends of the beam creating a bending motion of the beam radiating into the water or other medium, allowing a wide choice of materials for the bending beam and providing an additional means for achieving the desired resonance frequency and mechanical Q of the device.

Small piezoelectric induced motions at the end supports create leveraged magnified motion at the free end of a bending beam or at the center of a beam supported at both ends. With the supports replaced with piezoelectric material and operated in a bilaminar opposition mode with the small opposite piezoelectric motions amplified by the leveraging action of the bending beams. The piezoelectric material may be operated in the 33 mode where the motion is along the direction of the polarization arrows and electric field or also in the 31 and planar modes where the motion is perpendicular to the electric field and polarization arrows. With a reversed polarization direction on two pieces, the motion will be in opposite directions causing the supported beam to bend and radiate. Opposite direction motion may also be obtained by reversing the phase of one of the driving voltages. A bilaminar mode with one part piezoelectric active and a second part inactive with material, such as a metal, may also be used as an effectively active driven support, but with reduced coupling coefficient. A tri-laminar, three section drive with an inactive central section may be used to increase the effective coupling coefficient and also provide an inactive area for compressive bolts. Increased radiation area may be obtained with multiple beams driven by multi sided piezoelectric structures operated in the 31, planar or 33 piezoelectric modes.

In accordance with the invention there is provided an electro-mechanical transduction apparatus that employs at least one bender beam and is supported and driven, at least on one end by means of a piezoelectric structure where the inner part is driven and moves oppositely from the outer part causing the beam to move with leveraged amplified motion. In the case of only one beam and one piezoelectric support a stiff inertial mass would be mounted on the opposite end of the support. If there was a piezoelectric support on each end of the beam, the stiff inertial mass would be mounted on both supports. If there were two bending beams, the piezoelectric end support would be between the two beams on one end with the other end free or supported with another piezoelectric driver.

In accordance with one embodiment of the present invention, the bending beams may be replaced with discs and piezoelectric driven ring end supports. The bending beams may also be replaced by a multi sided plate, such as a square or octagonal shape with piezoelectric driven supports on each end.

In accordance with other aspects of the present invention the piezoelectric end supports are electrically insulated from the water and can be a source of mechano-acoustical radiation when mechanically in contact with the water. This radiation will add to the output in the band above the fundamental bending beam resonance and below the piezoelectric support bending resonance. This condition can be optimized to increase the bandwidth and output between these two resonances.

In accordance with still other aspects of the present invention the piezoelectric end supports may be isolated from the water with radiating convex or concave extension structures from the ends of the bending beams. The convex end extension will add to the output below the beam resonance. The concave extension will add to the output above the fundamental bending beam resonance and can be optimized to increase the bandwidth. The concave or convex structures may also be used to apply a compressive mechanical bias to the piezoelectric active end supports. Bolts may be used to compresses the piezoelectric material and their glue joints for the cases of no convex or concave end extensions.

Although the interior out-of-phase radiation from the bending beams and the piezoelectric end supports may be useful in some applications, such as free flooded operation, this interior radiation can be avoided by the use of mechanically isolated side plates to prevent interior flooding and radiation from interfering with the exterior radiation.

In accordance with still other aspects of the present invention multiple bending beams of the invention may be combined with piezoelectric 31 mode square end plates or planar-driven-multisided end plates such as a hexagonal or octagonal shape providing piezoelectric driven supports on each end and greater bending beam radiation area. Both radial and circumferential motions are obtained with the hexagonal and octagonal shaped end drives providing improved performance.

In accordance with other aspects of the present invention with more than three multiple bending beams other acoustical modes of vibration may be excited to create not only omni-directional monopole modes of vibration but also directional modes such as dipole or quadrupole modes. This may be accomplished by driving electrically isolated sections of the piezoelectric end drives with an alternative phase of the voltage phase on an even number of sections. For example, if in the case of octagonal piezoelectric end pieces the top four sections were driven in opposite voltage phase with the bottom four sections, a dipole radiation beam pattern would be obtained. On the other hand, with sequentially alternating pairs of electrically isolated sections a quadrupole beam pattern would be formed. These modes may also be combined to form other beam patterns such as a cardioid pattern from the combination of the monopole and dipole beam patterns.

BRIEF DESCRIPTION OF THE DRAWINGS

Numerous other objects, features and advantages of the invention should now become apparent upon a reading of the following detailed description taken in conjunction with the accompanying drawings, in which:

FIG. 3 illustrates the dynamic motion of a finite element model of a dual beam bender driven by 33 mode bilaminar piezoelectric elements at each end.

FIG. 4 illustrates a dual bender beam with 33 mode tri-laminar piezoelectric elements at each end along with two compression bolts at each end.

FIG. 7 illustrates a single extended bending beam with two piezoelectric end pieces, with polarization direction, wiring and voltage, V, for exciting bending beam mode along with an extended stiff inertial mass.

FIG. 8 illustrates a pair of cantilever bending beams and piezoelectric end pieces with wiring, polarization direction and voltage, V, for exciting bending beam mode.

FIG. 9 illustrates a pair of bending beams and a pair of piezoelectric end pieces with wiring, polarization direction and voltage, V, for exciting bending beam mode.

FIG. 10 illustrates a pair of bending beams and a pair of piezoelectric end pieces with convex extensions on the ends of the beams.

DETAILED DESCRIPTION

In accordance with the present invention, there is now described a number of different embodiments for practicing the present invention. In the main aspect of the invention there is provided at least one bending beam mounted on piezoelectric drivers with phase reversed voltages or polarization to create the bending beam action and low frequency acoustic radiation into the intended fluid or gas medium.

Figure 1:
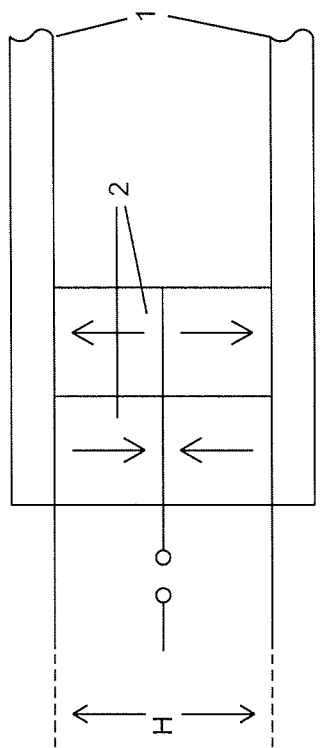
FIG. 1 illustrates two bending beams with two piezoelectric stacks of height H with reversed polarization direction arrows without a voltage applied.
Figure 2:
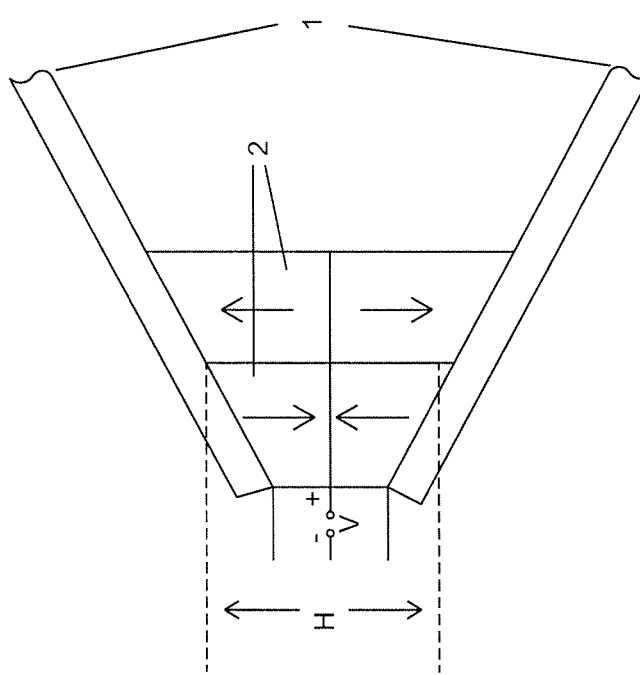
FIG. 2 illustrates the motion of two bending beams with two piezoelectric stacks of height H with reversed polarization direction, as in FIG. 1 but with a voltage V applied.

FIGS. 1, 2 and 3 illustrate the dynamic motion of two beams driven by 33 mode piezoelectric end pieces. FIG. 1 illustrates the quiescent condition of two beams, 1, with no drive voltage on the piezoelectric end pieces 2 of height, H, with reversed polarization arrows. FIG. 2 illustrates the exaggerated dynamic condition of two beams, 1, with drive voltage, V, on the piezoelectric end pieces 2 showing the expansion of the inner piezoelectric piece and contraction of the outer piece with no motion at the intersection, of height H, much like a lever arm rotating at the motionless intersection.

A finite element model illustrating the dynamic motion of two bending beams driven by piezoelectric supporting elements at the beam ends is illustrated in FIG. 3. The initial position of the beams is illustrated by the dashed lines L. In this part of the cycle the beams are bending outward and the inner parts of the piezoelectric supports are expanded and the outer parts are contracting along with a slightly curved inward motion. Here the inner portion of the piezoelectric material is driven into extension while the outer portion is driven into contraction. All the directions would be reversed on the next half cycle of the voltage applied to the piezoelectric end driven supports.

Figure 12:
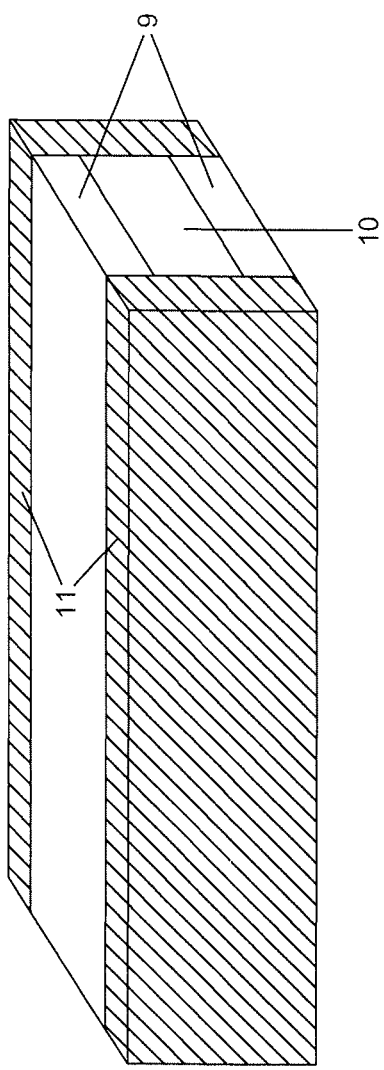
FIG. 12 illustrates a pair of bending beams and a pair of piezoelectric end pieces along with side plates to contain any interior radiation and prevent fluid ingression.

FIG. 4 illustrates dual bender beams, 1, with 33 mode tri-laminar piezoelectric elements, 2, at each end along with pairs of compression bolts 3 at each end. Eight tri-laminar piezoelectric plates are illustrated at the ends of the bending beams one of which is shown in detail of FIG. 5. Four thin stiff electrical insulators between the ends of the two bending beams and the ends of the two tri-laminar piezoelectric stacks are indicated as 4. Not shown are the end plates which are shown in FIG. 12 as item, 11.

Figure 5:
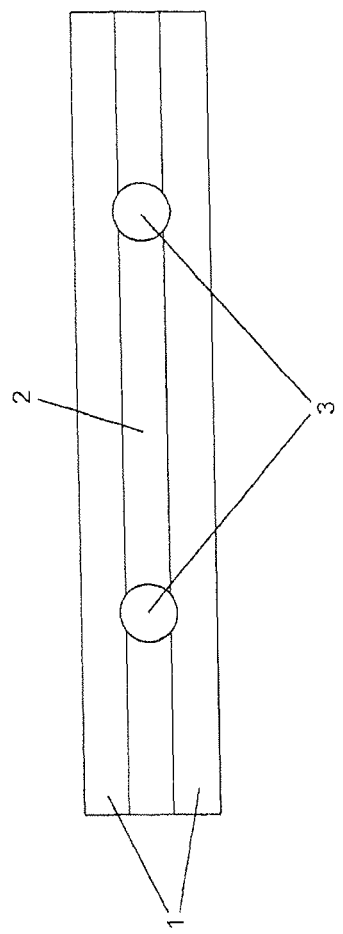
FIG. 5 illustrates a tri-laminar piezoelectric plate with an inactive central section and two holes for compression bolts.

FIG. 5 illustrates a single tri-laminar piezoelectric plate with two active sections, 1, with four (two on the top and two on the bottom) electrode surfaces and an inactive central section, 2, with two holes for compression bolts 3. The bolts 3 preferably extend through each of the two bending beams 1 and through respective tri-laminar piezoelectric stacks 2.

Figure 6:
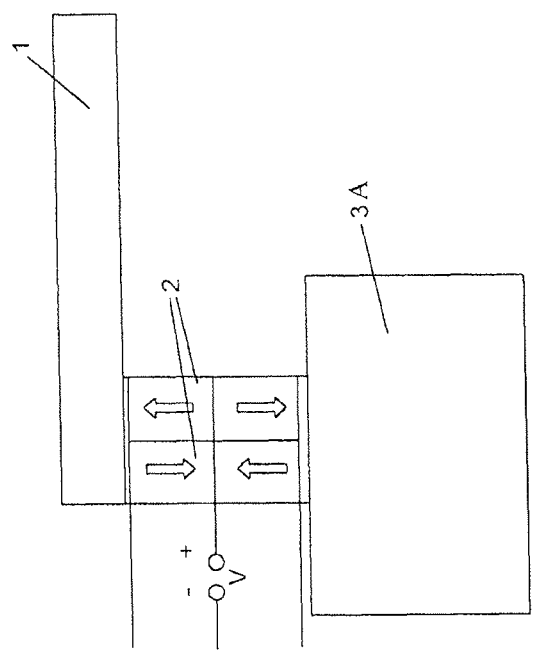
FIG. 6 illustrates a single bending beam, 33 mode piezoelectric end pieces with polarization direction, wiring and voltage, V, for exciting a cantilever bending beam mode along with a stiff inertial reaction mass.

FIG. 6 schematically illustrates a single bending beam, 1, acting as a free end cantilever bending beam with piezoelectric end pieces, 2, along with wiring and voltage V for exciting the bending beam mode of the cantilever bar. Here a stiff inertial mass, 3A, is used as a reaction force, without a second bending beam in place. The voltage −V is opposite in phase to the voltage V and causes the inner pieces to contract while the outer pieces expand because of the reversed direction of the polarize arrows. The arrows shown in the piezoelectric end pieces, 2, indicate the direction of polarization for this 33 dipole mode of operation. If, alternatively, the direction of polarization on the inner pieces and outer pieces were the same direction and not reversed, then the same effect could be obtained with the inner and outer voltages separately wired and reversed in polarity.

FIG. 7 schematically illustrates a single extended bending beam, 1, supported on both ends by piezoelectric end pieces, 5, with wiring, polarization directions and voltage V for exciting a bending beam mode and the extended stiff inertial mass 6. This case approximates the case of single bending beam simply supported at both ends. If the beam and inertial mass were replaced by discs and the piezoelectric supports were replaced by rings, then FIG. 7 would represent a cross section of a circular device.

FIG. 8 illustrates a pair of bending beams, 7, and piezoelectric end piece, 8, with wiring, polarization directions and voltage, V, for exciting the bending beam mode. Because of the symmetry of the pair of beams 7, no inertial mass is needed as was depicted in FIG. 6.

FIG. 9 illustrates a pair of bending beams, 9 and a pair of piezoelectric end pieces, 10, with wiring, polarization directions and voltage V for exciting bending beam mode, as depicted by the arrows in FIG. 9. This case approximates the condition of two end-driven simply supported beams. FIG. 3 is a finite element model of FIG. 9. If the beams were replaced by discs and the piezoelectric supports were replaced by rings, then FIG. 9 would represent a cross section of a circular device.

FIG. 10 illustrates a pair of bending beams, 9, and a pair of piezoelectric end pieces, 10, with convex extensions on the ends of the beams to shield the piezoelectric end supports, increase the response below the fundamental beam resonance and provide a means for compressing the piezoelectric end elements, 10.

Figure 11:
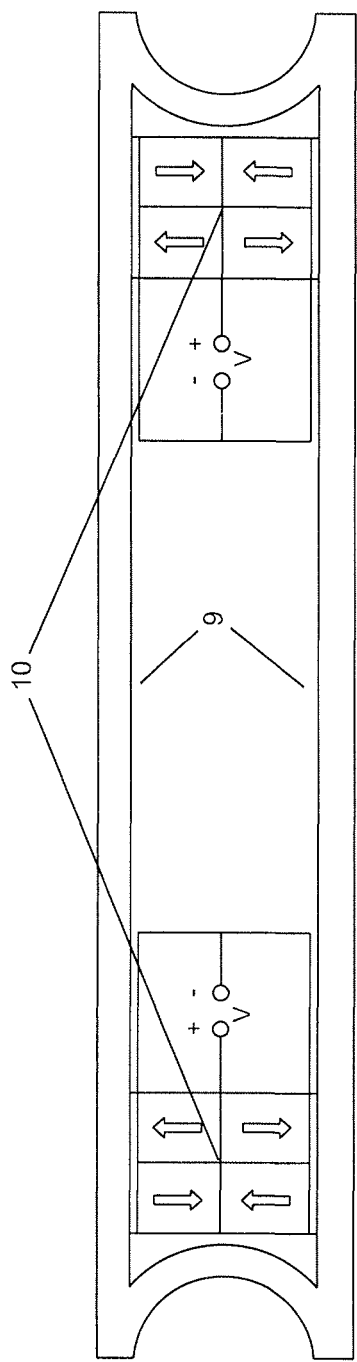
FIG. 11 illustrates a pair of bending beams and a pair of piezoelectric end pieces with concave extensions on the ends of the beams.

FIG. 11 illustrates a pair of bending beams, 9, and a pair of piezoelectric end pieces, 10, with concave extensions on the ends of the beams to shield the piezoelectric end supports, increase the response above the fundamental beam resonance and provide a means for compressing the piezoelectric end elements, 10.

FIG. 12 illustrates a pair of bending beams, 9 and a pair of piezoelectric end pieces, 10, along with (shaded) side plates, 11, to contain any interior radiation. The side plates would be mechanically isolated from the bending beams and piezoelectric elements by means of soft gaskets (not shown in FIG. 12). The plates 11 are used to prevent the outer medium from entering the interior of the transducer.

Figure 13:
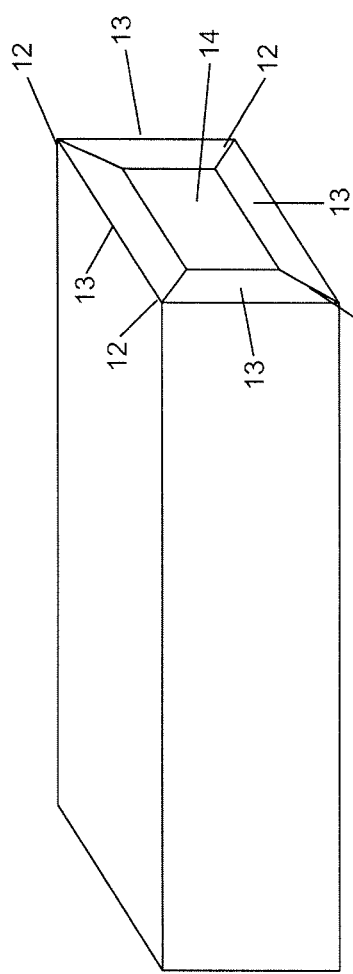
FIG. 13 illustrates four tapered bending beams and a pair of piezoelectric end driven pieces on each enclosing the complete transducer with radiation from all sides.

FIG. 13 illustrates a more complete four, optionally tapered, bending beams, 13, and a pair of 31 mode piezoelectric end pieces, 14, (see FIG. 14) on each end along with soft gaskets, 12, enclosing the complete transducer and providing full radiation from all sides. Other possible arrangements would be with three, six and eight bending beams with triangular, hexagonal and octagonal piezoelectric end driven supports, respectively.

Figure 14:
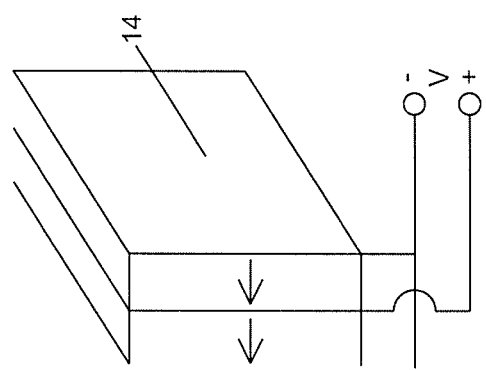
FIG. 14 illustrates the piezoelectric end support driver pieces of FIG. 13 set for operation in the piezoelectric 31 mode and wired with one plate able to move in an extension mode while the second plate moves in a contraction mode and vice versa on the next half cycle.

FIG. 14 illustrates the FIG. 13 piezoelectric end support driver pieces, 14, set for operation in the 31 piezoelectric mode, driven by voltage V, polarization direction arrows and wired with one plate able to move in a planar extension mode while the second plate moves in the opposite direction and vice versa on the next half cycle.

Figure 15:
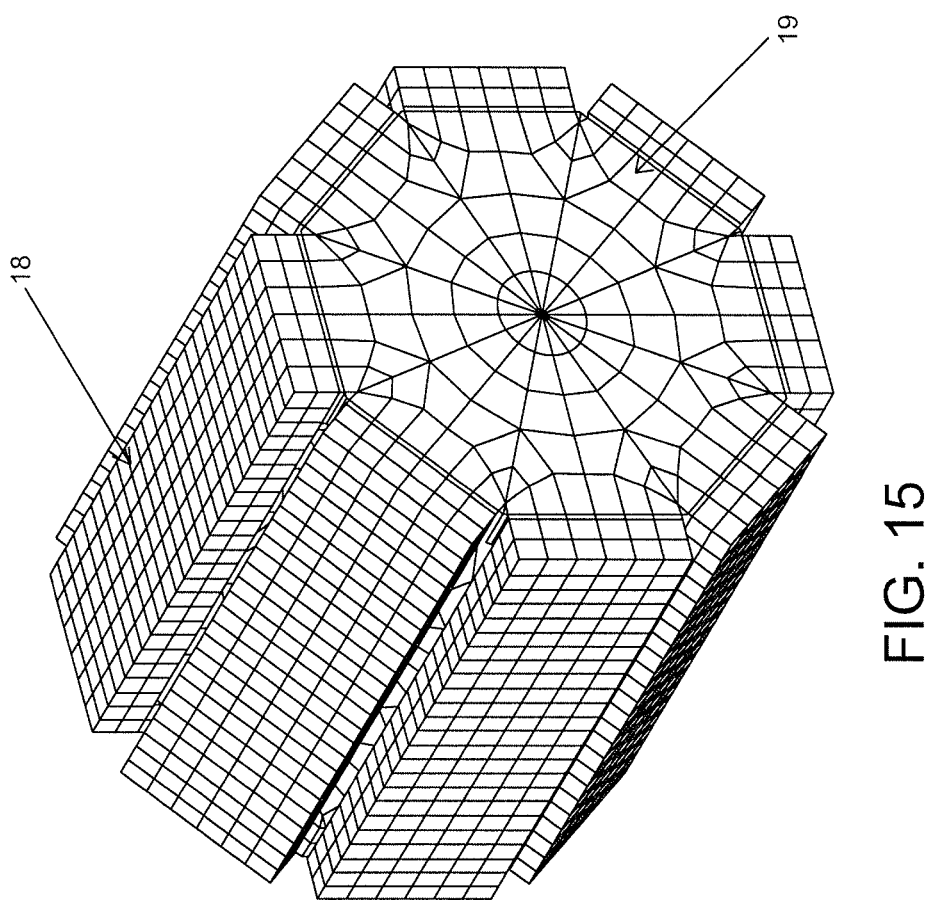
FIG. 15 illustrates the piezoelectric end support driver pieces of FIG. 13 set for operation in the piezoelectric 33 mode and wired with one plane able to move in an extension mode while the second plane moves in a contraction mode and vice versa on the next half cycle.

FIG. 15 illustrates the piezoelectric end support driver pieces of FIG. 13 set for operation in the 33 mode and wired with one plane, 16, able to move in an extension mode while the second plane, 17, able to move in a contraction mode and vice versa on the next half cycle.

Figure 16:
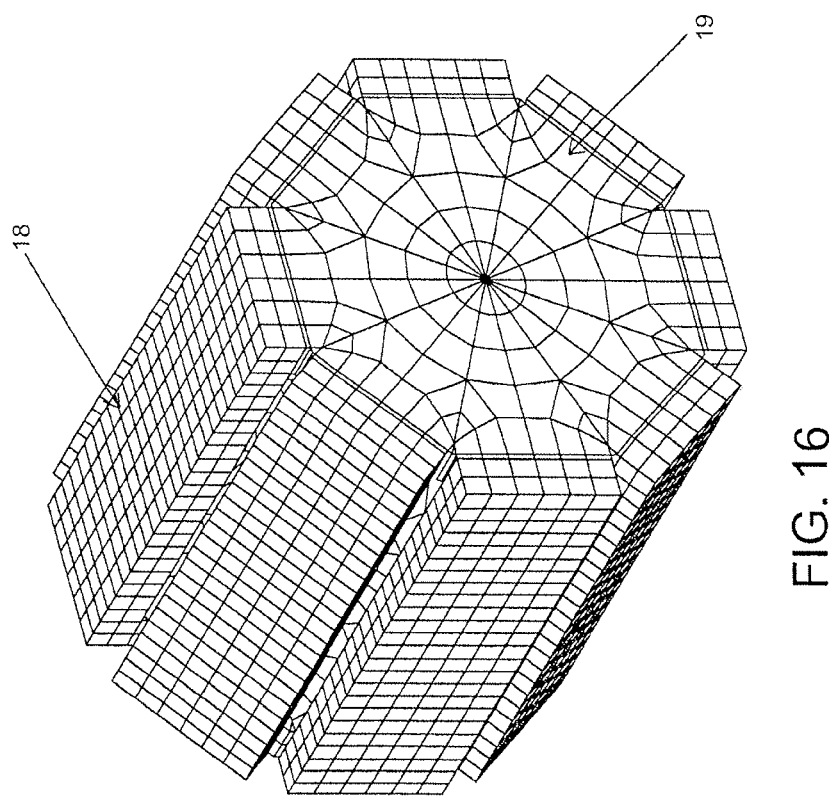
FIG. 16 illustrates eight bending beams and a pair of octagonal piezoelectric end driven pieces on each end enclosing the complete transducer with radiation from all sides.

FIG. 16 illustrates a complete octagonal transducer with eight, bending beams, 18, and a pair of planar mode piezoelectric end driven pieces, 19, (see FIG. 17) on each end enclosing the complete transducer and providing full radiation from all sides.

Figure 17:
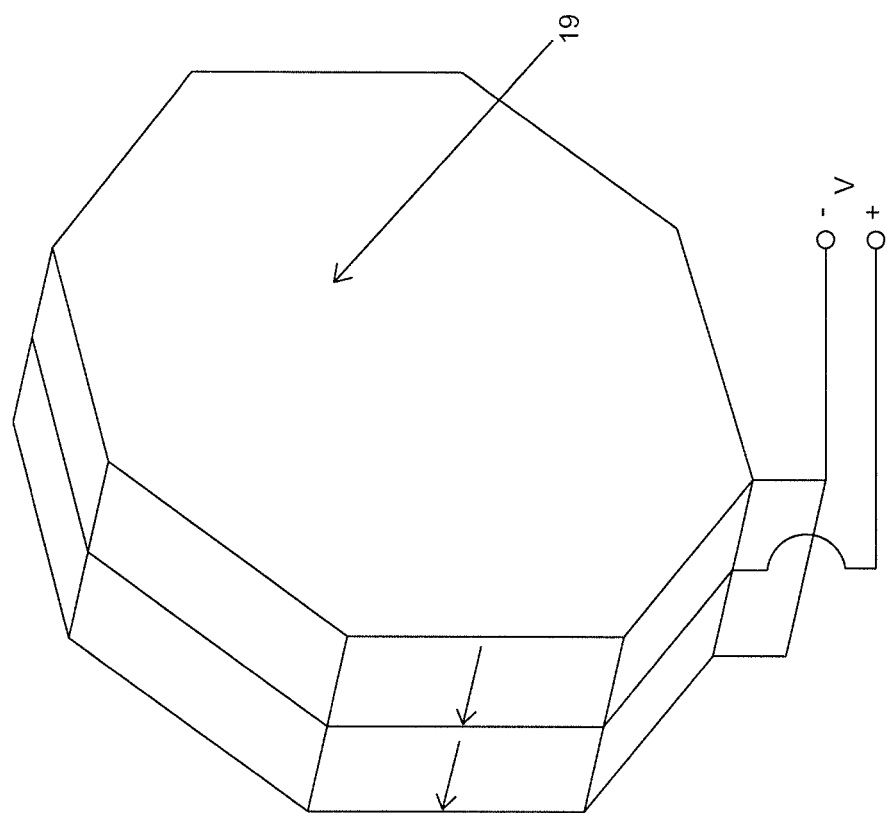
FIG. 17 illustrates the piezoelectric end support driver pieces of FIG. 16 set for operation in the bilaminar piezoelectric planar mode and wired with one plate able to move in a planar extension mode while the second plate moves in a planar contraction mode and vice versa on the next half cycle.

FIG. 17 illustrates the FIG. 16 piezoelectric octagonal end support driver pieces, 19, set for operation in the planar piezoelectric mode, driven by voltage, V, with polarization direction arrows and wired with one plate able to move in a planar extension mode while the second plate moves in the opposite direction and vice versa on the next half cycle.

Figure 18:
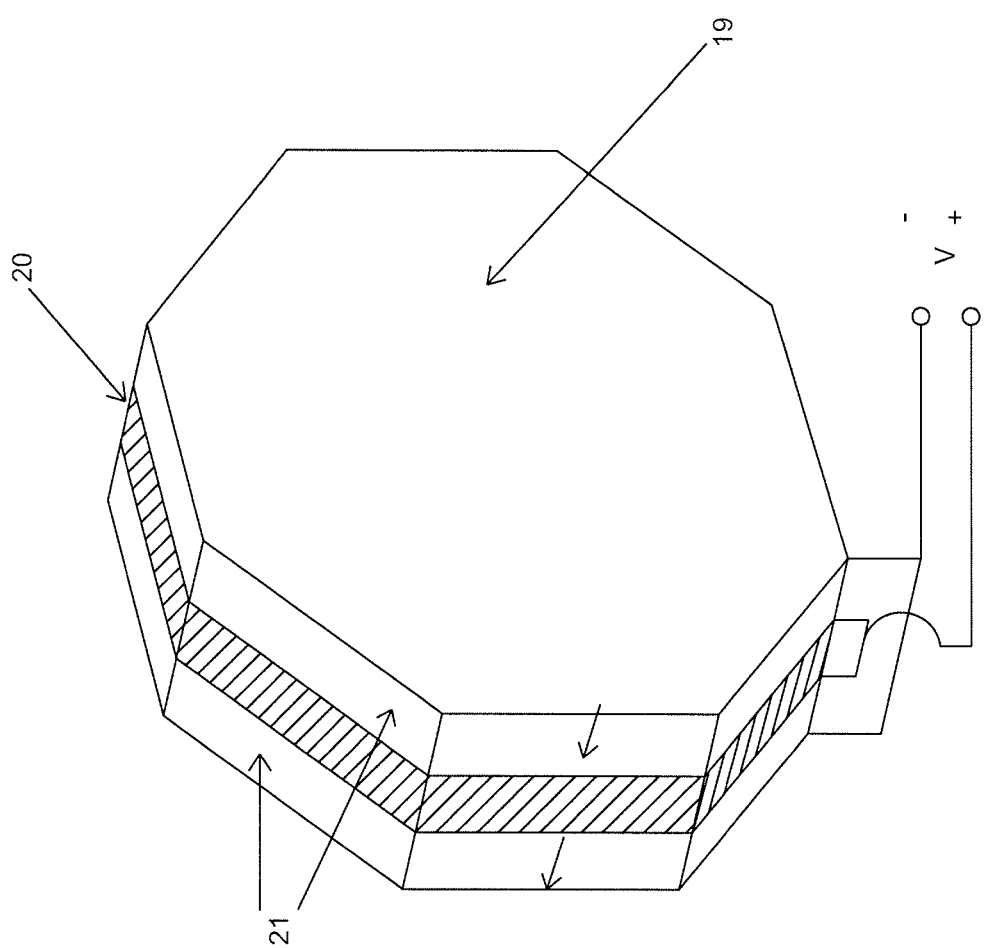
FIG. 18 illustrates the piezoelectric end support driver pieces of FIG. 16 set for operation in the tri-laminar piezoelectric planar mode and wired with one plate able to move in a planar extension mode while the second plate moves in a planar contraction mode and vice versa on the next half cycle along with a central plate that is not piezoelectric activated.

FIG. 18 illustrates the piezoelectric octagonal end support driver pieces of FIG. 16 set for operation in the tri-laminar piezoelectric planar mode, 19, with central inactive inner plate, 20, and outer plates, 21, which are wired for one plate to move in a planar extension mode while the second plate moves in a planar contraction mode and vice versa on the next half cycle.

Figure 19:
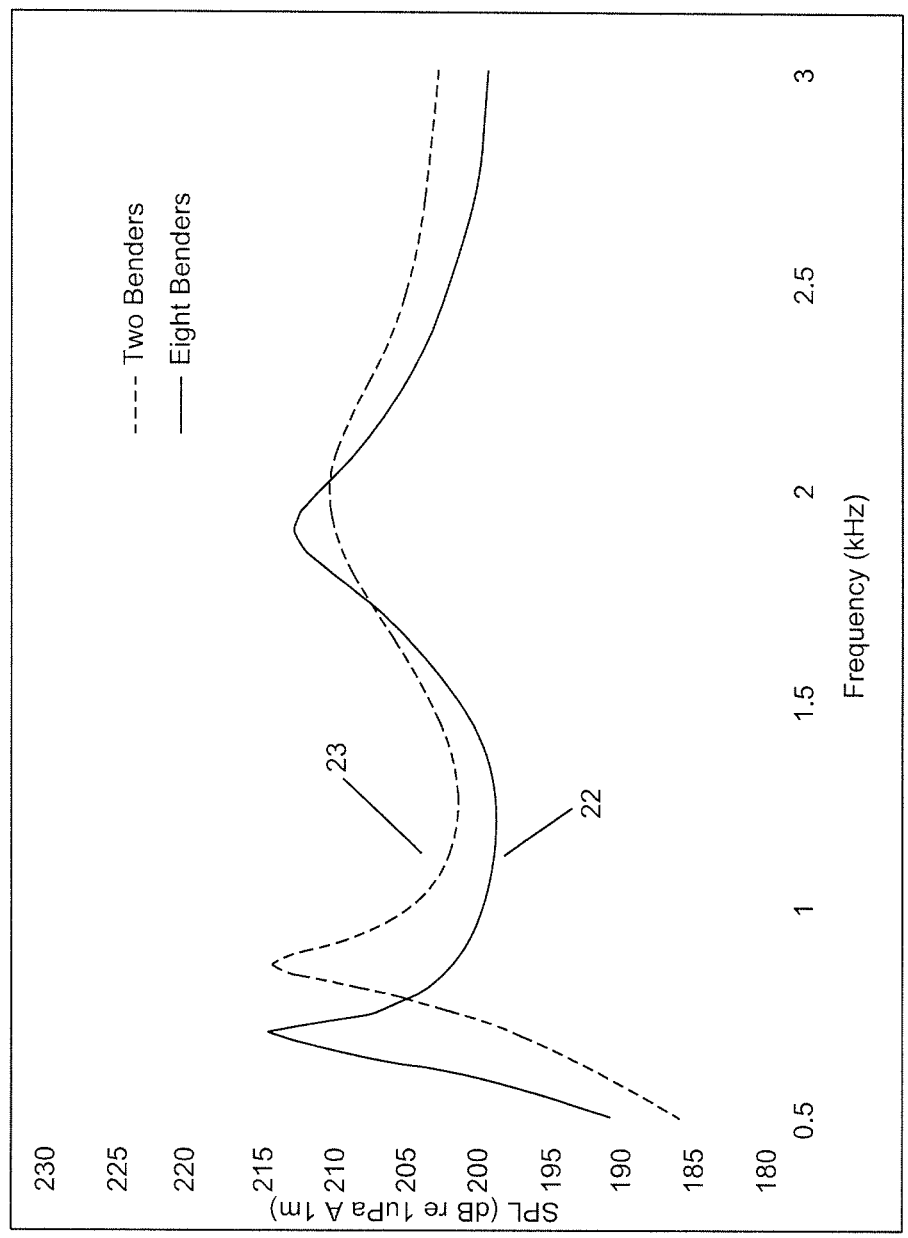
FIG. 19 illustrates finite element calculated Sound Pressure Level (SPL) response as a function of frequency for the two beam design of FIGS. 3 and 12, as curve 22, and the eight beam design of FIG. 16, as curve 23, both with approximately the same total radiating area.
Figure 15:
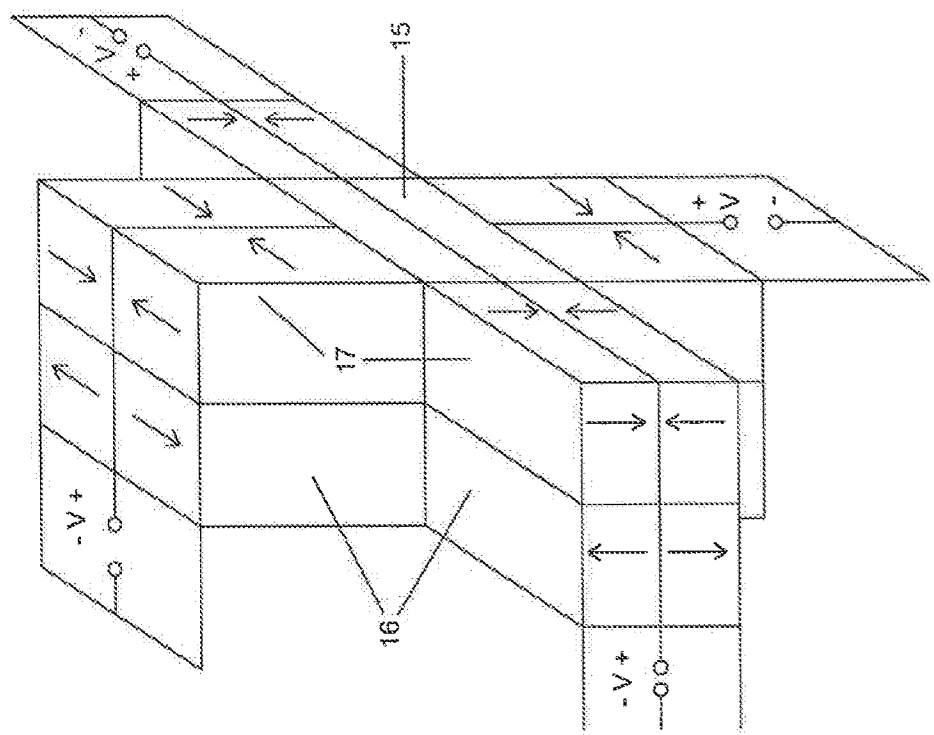

FIG. 19 illustrates finite element calculated Sound Pressure Level (SPL) response as a function of frequency for the two-beam design of FIGS. 3 and 12, with a volume of approximately 500 cubic inches, represented as curve 22, and the eight-beam design of FIG. 16, represented as curve 23, both designs with approximately the same total radiating area. The first resonance peak of each curve is due to the fundamental bending resonance of the bender beams while the second resonance peak is due to the fundamental bending resonance of the piezoelectric driven support for the beams. The null-free smooth response between the peaks is a result of the in-phase radiation addition between the two fundamental resonances. The two beam design generally yields the lower fundamental resonance frequency, because of the more compliant end supports with less lateral restriction. The eight beam design leads to greater output between and above resonances.

The following is a summary of important aspects of the present invention.

1. A low frequency underwater sound electro-mechanical transduction bender beam apparatus that employs at least one bender beam and is supported and driven, at least on one end, by means of a piezoelectric structure where the inner part is driven in the opposite direction from the outer part causing the beam to move with leveraged amplified motion.

2. A bender transducer wherein the driven bender beam is not piezoelectric.

3. A bender transducer wherein the driven bender beam is piezoelectric.

4. A bender transducer wherein the piezoelectric structure is bilaminar in which one of the two laminar pieces is piezoelectric and the second laminar piece is not.

5. A bender transducer where the piezoelectric structure is bilaminar where both of the two laminar pieces are piezoelectric and wired or poled for motion in opposite directions.

6. A bender transducer where the piezoelectric structure is tri-laminar where both of the two outer laminar pieces are piezoelectric and wired or poled for motion in opposite directions and the center laminar piece is not piezoelectric.

7. A bender transducer where bolts are used to apply compression on the piezoelectric structure through holes in the central laminar section.

8. A bender transducer with only one bender cantilever beam and an inertial mass separated by the piezoelectric support.

9. A bender transducer with two bender cantilever beam separated and driven by the piezoelectric support.

10. A bender transducer composed of two bending beams and two piezoelectric end driving supports.

11. A bender transducer where the beams are replaced by discs and the end drive piezoelectric material is in the form of a ring.

12. A bender transducer where the piezoelectric end drivers are isolated from the water with radiating convex or concave structures, as an extension from the ends of the bending beams.

13. The concave or convex structures maybe used to apply a compressive mechanical bias the piezoelectric active end supports.

14. The convex structures may be used to increase the acoustic output below and at the fundamental resonance.

15. The concave structures may be used to increase the acoustic output above the fundamental resonance.

16. The transducer where mechanically isolated side plates are used to prevent interior flooding and radiation from interfering with the exterior radiation.

17. The transducer with three or more bending beams and a pair of 33 mode piezoelectric end pieces with ends equal to the number of bending beams along with a common stiff center piece, enclosing the complete transducer and providing full radiation from all sides.

18. The transducer with three or more bending beams and a pair of 31 mode or planar mode piezoelectric end pieces with ends equal to the number of bending beams, enclosing the complete transducer and providing full radiation from all sides.

19. The transducer with piezoelectric end drive pieces excited into higher order modes of vibration by alternating the voltage phase of sections which are electrically isolated from each other.

20. The transducer where the radiation from both the driven bending beam and the piezoelectric support driven combined together to form a null-free smooth response between their fundamental resonances.

21. The transducer which is composed of six bending beams with two piezoelectric driven hexagonal shaped end support pieces.

22. The transducer which is composed of eight bending beams with two piezoelectric driven octagonal shaped end support pieces.

23. The transducer which is composed of a cylindrical bending structure with two piezoelectric driven circular end support pieces.

Having now described a limited number of embodiments of the present invention, it should now become apparent to those skilled in the art that numerous other embodiments and modifications thereof are contemplated, such as additionally driving prior piezoelectric benders with piezoelectric end driven supports, as falling within the scope of the present invention, as defined in the appended claims.

What is claimed is:

1. A low frequency underwater sound electro-mechanical transduction bender beam apparatus that is comprised of at least one bender beam and a piezoelectric structure, said at least one bender beam being supported and driven, at least on one end thereof, by means of contact from the piezoelectric structure, said piezoelectric structure having inner and outer piezoelectric parts, wherein the inner piezoelectric part of the piezoelectric structure is driven in an opposite direction from the outer piezoelectric part causing the beam to move with amplified motion, wherein the bender beam has opposite one and other ends along a longitudinal axis, wherein the piezoelectric structure drives the elongated bender beam at the one end thereof, wherein the outer piezoelectric part of the piezoelectric structure is closer along the longitudinal axis to the one end of the bender beam than the inner piezoelectric part of the piezoelectric structure, wherein said inner piezoelectric structure is bilaminar including first and second laminar pieces, wherein said outer piezoelectric structure is bilaminar including third and fourth laminar pieces and wherein said inner piezoelectric structure is laminated to said outer piezoelectric structure, wherein the elongated bender beam is supported by the piezoelectric structure continuously along an entire width of both the inner piezoelectric structure and the outer piezoelectric structure.

2. The beam apparatus of claim 1 where the driven bender beam is one of non-piezoelectric and piezoelectric.

3. The beam apparatus of claim 1 where the piezoelectric structure is bilaminar thus including two laminar pieces, and in which one of the two laminar pieces is piezoelectric and the other laminar piece is non-piezoelectric.

4. The beam apparatus of claim 1 where the piezoelectric structure is tri-laminar and includes opposite end piezoelectric pieces, and wherein both of the two outer laminar parts are piezoelectric and wired or poled for motion in opposite directions and a center laminar part is non-piezoelectric.

5. The beam apparatus of claim 4 further including bolts to apply compression on the piezoelectric structure through holes in the central laminar part thereof.

6. The beam apparatus of claim 1 wherein the at least one bender beam includes only one bender cantilever beam and an inertial mass that is disposed opposite to the bender cantilever beam.

7. The beam apparatus of claim 1 including two bender cantilever beams separated and driven by opposite piezoelectric structures.

8. The beam apparatus of claim 7 wherein the opposite piezoelectric structures are comprised of two piezoelectric end driving supports.

9. The beam apparatus of claim 8 including mechanically isolated side plates that are used to prevent interior flooding and radiation from interfering with the exterior radiation.

10. The beam apparatus of claim 8 wherein the beams are in the form of bending discs and piezoelectric end driving supports is in the form of a ring.

11. The beam apparatus of claim 7 where the piezoelectric end driving supports are isolated from water with radiating convex or concave structures, as an extension from the ends of the bending beams.

12. The beam apparatus of claim 11 wherein the convex structure is used to apply a compressive mechanical bias to the piezoelectric end driving supports.

13. The beam apparatus of claim 1 used to, one of, increase the acoustic output below the fundamental resonance, above the fundamental resonance and at the fundamental resonance.

14. The beam apparatus of claim 1 with three or more bender beams and the piezoelectric structure comprises a pair of 33 mode piezoelectric end pieces with ends equal to the number of bending beams along with a common stiff center piece, enclosing the complete apparatus and providing full radiation from all sides.

15. The beam apparatus of claim 1 with three or more bending beams and the piezoelectric structure comprises a pair of 31 mode or planar mode piezoelectric end pieces with ends equal to the number of bending beams, enclosing the complete apparatus and providing full radiation from all sides.

16. The beam apparatus of claim 1 with two or more bending beams with supporting drivers wherein the piezoelectric end driver supports are excited into higher order modes of vibration by alternating the voltage phase of sections which are electrically isolated from each other.

17. The beam apparatus of claim 1 where the radiation from both the driven bending beam and the piezoelectric support are combined together to form a null-free smooth response between their fundamental resonances.

18. The beam apparatus of claim 1 which is comprised of one of six bending beams with two piezoelectric driven hexagonal shaped end support pieces, eight bending beams with two piezoelectric driven octagonal shaped end support pieces, and a cylindrical bending structure with two piezoelectric driven circular end support pieces.

19. The beam apparatus of claim 1 where the bender beam is elongated having opposite one and other free ends, wherein each of the respective inner and outer piezoelectric parts of the piezoelectric structure is multi-laminar and including at least two piezoelectric pieces that are attached to the at least one beam and that are respectively driven in the opposite direction in order to cause the beam to move with amplified motion.

20. The beam apparatus of claim 19 wherein the bender beam comprises a first bender beam and a second bender beam, wherein the piezoelectric structure is disposed between the first bender beam and the second bender beam, and further comprising a second piezoelectric structure, and wherein both piezoelectric structures are disposed between the two beams.

21. The beam structure of claim 20 wherein the inner and outer parts of the piezoelectric structure are each multi-laminar and further are disposed to contact in an adjacent manner so as to form a unitary multi-laminate piezoelectric structure.

22. The beam apparatus of claim 19 including separate piezoelectric structures; one piezoelectric structure disposed at the one free end of the elongated bender beam, and the other piezoelectric structure disposed at the other free end of the elongated bender beam.

23. The beam apparatus of claim 22 further including an inertial mass connected with the separate piezoelectric structures at a location remote from the bender beam.

24. The beam structure of claim 1, wherein an end of the piezoelectric structure is coterminous with the one end of the bender beam.

25. The beam structure of claim 1 wherein the bender beam comprises a first bender beam and a second bender beam, wherein the piezoelectric structure is disposed between the first bender beam and the second bender beam.

26. A low frequency underwater sound electro-mechanical transduction bender beam apparatus that is comprised of:
a pair of elongated and separately spaced apart bender beams each having one and other ends;
a pair of piezoelectric structures;
said pair of elongated and separately spaced apart bender beams being supported and driven by the pair of piezoelectric structures;
each said piezoelectric structure having inner and outer piezoelectric parts, wherein the inner piezoelectric part of the piezoelectric structure is driven in an opposite direction from the outer piezoelectric part causing the beam to move with amplified motion;
said pair of piezoelectric structures mounted respectively between said pair of elongated and separately spaced apart bender beams;
wherein said inner piezoelectric part is bilaminar including first and second piezoelectric pieces, wherein said outer piezoelectric part is bilaminar including third and fourth piezoelectric pieces, and wherein said first, second, third, and fourth piezoelectric pieces are formed unitarily as the piezoelectric structure; and
wherein said elongated bender beam is supported by said piezoelectric structure along an entire width of both the inner and outer parts of the piezoelectric structure.

27. The beam apparatus of claim 26, wherein the piezoelectric structure drives the bender beams at the one end thereof, wherein the outer piezoelectric part of the piezoelectric structure is closer along a longitudinal axis of the bender beams to the one end of the bender beams than the inner piezoelectric part of the piezoelectric structure.

28. The beam structure of claim 26, wherein each of the respective inner and outer piezoelectric parts of the piezoelectric structure is bilaminar thus including two laminated pieces that are attached to at least one of the bender beams and that are respectively driven in the opposite direction in order to cause the beams to move with the amplified motion.

29. The beam apparatus of claim 28 including separate piezoelectric structures; one piezoelectric structure disposed at the one free end of the elongated bender beams, and the other piezoelectric structure disposed at the other free end of the elongated bender beams.

30. The beam apparatus of claim 29 further including an inertial mass connected with the separate piezoelectric structures at a location remote from the bender beams.

31. The beam apparatus of claim 26, wherein an end of the piezoelectric structure is coterminous with the one end of the bender beams.

* * * * *

UNITED STATES PATENT AND TRADEMARK OFFICE
CERTIFICATE OF CORRECTION

Page 1 of 2

PATENT NO. : 10,744,532 B1
APPLICATION NO. : 15/586933
DATED : August 18, 2020
INVENTOR(S) : John L. Butler and Alexander L. Butler It is certified that error appears in the above-identified patent and that said Letters Patent is hereby corrected as shown below:

In the Drawings

Please replace FIG. 15 with new FIG. 15 as shown on the attached page.

Signed and Sealed this
Eighth Day of December, 2020

Andrei Iancu
*Director of the United States Patent and Trademark Office*